United States Patent [19]

Takao et al.

[11] Patent Number: 4,647,614
[45] Date of Patent: Mar. 3, 1987

[54] DIENE ELASTOMER COMPOSITIONS

[75] Inventors: Hiroyoshi Takao; Nobuyuki Yoshida; Akio Imai, all of Chiba, Japan

[73] Assignee: Sumitomo Chemical Company, Limited, Osaka, Japan

[21] Appl. No.: 804,843

[22] Filed: Dec. 5, 1985

[30] Foreign Application Priority Data

Dec. 7, 1984 [JP] Japan .................. 59-259662

[51] Int. Cl.$^4$ .................. C08K 3/04; C08L 9/00; C08L 47/00; C08F 136/00
[52] U.S. Cl. ..................... 524/526; 524/495; 524/496; 525/236; 525/237; 526/335; 526/340
[58] Field of Search ............... 525/236, 237; 524/526, 524/495, 496; 526/335, 340

[56] References Cited

U.S. PATENT DOCUMENTS

| | | | |
|---|---|---|---|
| 4,385,151 | 5/1983 | Furukawa et al. | 526/340.2 |
| 4,436,873 | 3/1984 | Furukawa et al. | 525/314 |
| 4,471,093 | 9/1984 | Furukawa et al. | 525/237 |
| 4,482,678 | 11/1984 | Furukawa et al. | 525/236 |
| 4,523,618 | 6/1985 | Yamamoto et al. | 525/194 |
| 4,550,135 | 10/1985 | Iwama et al. | 524/495 |

*Primary Examiner*—Herbert J. Lilling
*Attorney, Agent, or Firm*—Cushman, Darby & Cushman

[57] ABSTRACT

Disclosed is a diene elastomer composition especially suitable as tread rubber of tires which has low rolling resistance and high wet grip in combination. This elastomer composition contains a rubber material comprising an elastomeric polymer component of a butadiene polymer and/or a styrene-butadiene copolymer and a rubbery component. The elastomeric polymer is produced by using an organolithium compound as a polymerization initiator, and has a long chain end concentration (LCEC) of 1.5 or less as defined by the following formula:

$$LCEC = \sum_i \beta i \times (a \times 10^5)/(\overline{MW})_i$$

wherein $a$: total number of terminal groups in long chain molecules per polymer, $\overline{MW}$: a value obtained from intrinsic viscosity of the polymer as measured in toluene at 30° C. by the following formulas:

$\overline{MW} = 70{,}660 \times [\eta]^{1.282}$ for styrene-butadiene copolymer,
$\overline{MW} = 79{,}167 \times [\eta]^{1.443}$ for butadiene polymer,
$\beta i$: weight fraction of component i when $\overline{MW} = (\overline{MW})_i$.

5 Claims, No Drawings

DIENE ELASTOMER COMPOSITIONScl

BACKGROUND OF THE INVENTION

This invention relates to a diene elastomer-containing composition especially suitable as tread rubbers of automobile tires.

Recently, reduction in fuel cost for running of automobiles has been strongly demanded for saving of energy. Especially because rolling resistance of tire has an important effect on saving of fuel cost, reduction and improvement of the rolling resistance are pressingly needed in this industrial fields.

When the running resistance caused by rolling of a tire is considered from the view point of structural elements of tire, it is recognized that the tread rubber greatly participates therein, namely, in about 40% of the rolling resistance of the whole tire.

Rolling resistance of tire is caused by energy loss which is due to repeated deformations of tire during running of automobiles. Thus, reduction of rolling resistance means reduction of the energy loss.

On the other hand, wet grip property is an important characteristic required for tires considering the safety during running of automobiles. This is the characteristic of tires which has relation with the driving safety and breaking efficiency on a wet road surface, for example, when rain falls and is a frictional resistance which occurs due to contact of tread surface of tire with the road surface.

Conventionally natural rubber, polyisoprene rubber, high cis-1,4-polybutadiene rubber, styrene-butadiene rubber produced by emulsion polymerization method, etc. have been mainly used as rubber components of tread rubber compositions. The former three are excellent in rolling resistance, but low in wet grip. The styrene-butadiene rubber is excellent in wet grip, but inferior in rolling resistance. Thus, the two contradictory properties, rolling resistance and wet grip have not been compatible with each other. Therefore, either one of these properties has been sacrificed or these two properties have been balanced by mixing the above rubbers. However, these are still far unsatifactory from the standpoint of compatibility of high wet grip and low rolling resistance. P Furthermore, recently various rubbery compositions have been proposed which are to improve the balance of these two properties. However, from a viewpoint of the rubber polymer structures, these proposals are based on use of polymers exhibiting high glass transition temperatures, namely, higher than about −50° C. This makes an improvement in that wet grip can be increased, but makes no clarification of the relation between rolling resistance of the compositons and molecular shapes of raw material polymers. Expecially these proposals are considerably unsatisfactory in design of molecules of raw material elastomers capable of affording industrially utilizable excellent compositions of low rolling resistance.

Considering repeated movement of thread rubber in connection with rolling resistance of a tire, rolling resistance is due to the repeated movement caused by rotation of tire at running and frequency of the repeated movement is 10–100 Hz and the temperature at that time corresponds to 50° C.–80° C. Therefore, reduction in rolling resistance means to reduce loss of dynamic energy within such frequency and temperature ranges.

In an attempt to develop rubbery compositions which satisfy the two requirements, i.e., rolling resistance and wet grip suitable especially for tread rubbers of automobile tires, the inventors have made researches on the relation between molecular shape of raw material elastomers and loss of dynamic energy of vulcanized elastomer composition at a frequency of 10–100 Hz and a temperature of 50° C.–80° C. As a result, it has been found that use of diene elastomers comprising elastomers having a specific molecular structure can afford very low rolling resistance and excellent wet grip.

SUMMARY OF THE INVENTION

It is an object of this invention to provide a diene elastomer-containing composition which satisfies both the low rolling resistance and high wet grip which are especially suitable for tread tires.

DESCRIPTION OF THE INVENTION

The object of this invention has been achieved by providing a diene elastomer composition which contains a rubber material comprising an elastomeric polymer component and a rubbery component, said elastomeric component being butadiene homopolymer and/or styrene-butadiene copolymer which is produced by using an organolithium compound as a polymerization initiator. The elastomeric component has long chain end concentration (LCEC) of 1.5 or less as defined by the following formula:

$$LCEC = \sum_i \beta i \times (\alpha \times 10^5)/(\overline{MW})_i$$

wherein $\alpha$ is a constant defined as a total number of terminal groups in long chain molecules per polymers and is 2 for unbranched linear polymers and n for star polymers obtained by coupling propagating ends of the linear living polymers with an n-functional coupling reagent (referred to as "n-functional star polymers" hereinafter);

$\overline{MW}$ is, for the linear polymer, a value obtained from the following formulas on the basis of intrinsic viscosity ($[\eta]$) of the polymer measured in toluene at 30° C., and, for n=functional star polymer, the value $\overline{MW}$ obtained from the intrinsic viscosity of linear polymer before coupling is multiplied by n.

$\overline{MW}$ for styrene-butadiene copolymer:

$$\overline{MW} = 70,660 \times [\eta]^{1.282}$$

$\overline{MW}$ for butadiene homopolymer:

$$\overline{MW} = 79,167 \times [\eta]^{1.443}$$

$\beta i$ is a weight fraction of component i when $\overline{MW} = \overline{MW}_i$ and $$\sum_i$$

means sum of them on all components.

That is, LCEC used in this specification is the number of terminal groups in long chain molecules in elastomeric component which is allocated to each $10^5$ of molecular weight. According to this invention, it has been found that the mechanical loss factor (tan δ) at 50° C.–80° C. of vulcanized composition comprising elastomer to which compounding ingredients of a specific formulation are added is determined unconditionally by LCEC of raw material elastomers.

Regarding the LCEC, additive property exists among a plurality of elastomers. Mixtures of two unbranched linear polymers different in mean molecular weight, mixtures of a star polymer and a linear polymer or mixtures of a styrene-butadiene copolymer and a butadiene polymer are also included in this invention as far as a mean weight value of weight fraction of LCEC in original polymers is within the range as specified herein.

As preferable elastomeric polymer component used in the diene elastomer composition of this invention, there are linear polymers obtained by polymerization of butadiene or copolymerization of butadiene with styrene in a hydrocarbon solvent in the presence of a polar compound such as ether, tertiary amine or the like using an organolithium compound as a polymerization initiator. In addition, star polymers may be used which are obtained by coupling propagating ends of linear living polymers with a polyfunctional binder. These polymers may be used alone or in admixture.

These elastomeric polymers preferably have a long chain end concentration (LCEC) of 1.5 or less, especially 0.2-1.4. When the LCEC exceeds 1.5, reduction of rolling resistance is not satisfactory.

Furthermore, these elastomeric polymers have preferably a glass transition temperature within the range of $-55°$ C. to $-25°$ C. as measured by differential thermal analyzer (DSC) for obtaining high wet grip.

The diene elastomer composition of this invention contains said elastomeric polymer component as main rubber ingredient, preferably in an amount of at least 60% by weight of the rubber material. The other moiety component of the rubber material is a rubbery component such as natural rubbers, synthetic isoprene rubbers, styrene-butadiene rubbers produced by emulsion polymerization, high cis content polybutadiene rubbers, etc. in an amount of 0-40% by weight of the present composition.

When content of the rubbery component is higher than the above range, desirable diene elastomer compositions low in rolling resistance and superior in wet grip are not obtained.

In addition to these rubbery components, the diene elastomer composition of this invention may contain various compounding ingredients normally used for rubbery compositions such as carbon black, oils, stearic acid, zinc oxide, antioxidant, vulcanization accelerator, sulfur, etc., depending on the purposes. Carbon black may preferably be contained in an amount of 30-80 parts by weight for 100 parts by weight of the rubber material from the point of rolling resistance and strength. When oil is added, the amount is preferably 30 parts by weight or less per 100 parts by weight of the rubber material from the point of rolling resistance.

That is, the diene elastomer composition of this invention possesses both the two desired properties, low rolling resistance and high wet grip which have hitherto been considered incompatible with each other. Hence, the composition may be used preferably as rubbers for tread of automobile tires.

This invention will be further illustrated by the follwoing examples.

EXAMPLES 1-15 AND COMPARATIVE EXAMPLES 1-4

Various butadiene polymers and styrene-butadiene polymers A-H as shown in Table 1 were prepared by polymerization method which employs organolithium as a polymerization initiator. LCEC of these polymers were calculated from their intrinsic viscosity $[\eta]$ in accordance with the calculation formulas given hereinbefore.

The following ingredients were added to each polymer or mixture thereof and were mixed. Each mixture was press vulcanized at 150° C. for 30 minutes to obtain specimens for measurement of properties.

| Polymer (or polymer mixture) | 100 parts by weight |
|---|---|
| Ingredients Carbon black | 60 parts by weight |
| Aromatic oil | 20 parts by weight |
| Zinc oxide | 5 parts by weight |
| Stearic acid | 2 parts by weight |
| Vulcanization accelerator | 2 parts by weight |
| Sulfur | 1.5 parts by weight |

Each of the thus obtained specimens was subjected to measurement of properties. The results are given in Table 2.

LCEC of polymer mixture was calculated by the following formula and properties of the polymers and the specimens were measured by the following methods.

LCEC of mixture $= LCEC_I \times W_I + LCEC_{II} \times W_{II}$ (wherein suffixes I and II indicate polymers I and II, respectively and $W_I$ and $W_{II}$ indicate weight fraction of polymers I and II in the mixture, respectively.)

CONTENT OF STYRENE AND CONTENT OF 1,2-VINYL BOND

These were determined by analysis according to Morero method using an infrared absorption spectrometer. For determination of the styrene content, JIS method using a refractometer was also used in combination with the Morero method.

INTRINSIC VISCOSITY $[\eta]$

This was measured in toluene solvent at 30° C. using an Ostwald type solution viscometer.

GLASS TRANSITION TEMPERATURE

Measurement was made by a differential scanning calorimeter (DCS) (Du Pont) at a heating rate of 20° C./min and the transition temperature was determined from position of transition endothermic peak.

WET GRIP INDEX

Measurement was made on a vulcanized rubber sheet of in 6.5 mm thick using a portable skid resistance tester of Stanley Co. As the contacting road surface was employed an asphalt surface sprayed with water of 20° C.

LOSS FACTOR

Value of tan $\delta$ at 60° C. of vulcanized sheet was measured under the conditions of initial extension of 0.6%, both amplitudes of 0.1% and frequency of 11 Hz by a dynamic solid viscoelastometer of Toyo Bowldwin Co. The smaller tan $\delta$ indicates the lower rolling resistance.

TABLE 1

| Polymers | Kinds of Polymers | Styrene content (wt %) | Vinyl content (%) (Bound butadiene was assumed to be 100) | Glass transition temperature (°C.) | [η] | LCEC |
|---|---|---|---|---|---|---|
| A | Linear polybutadiene | — | 73 | −38.5 | 4.08 | 0.33 |
| B | Linear polybutadiene | — | 72 | −39.4 | 2.77 | 0.58 |
| C | Linear polybutadiene | — | 75 | −36.3 | 2.04 | 0.90 |
| D | Linear polybutadiene | — | 69 | −42.4 | 0.63 | 4.92 |
| E | Linear styrene-butadiene copolymer | 18 | 51 | −38.3 | 3.65 | 0.54 |
| F | Linear styrene-butadiene copolymer | 19 | 58 | −30.4 | 2.71 | 0.79 |
| G | Linear styrene-butadiene copolymer | 20 | 58 | −28.6 | 1.27 | 2.08 |
| H | Linear styrene-butadiene copolymer | 20 | 61 | −26.5 | 1.01 | 2.78 |

TABLE 2

| | Mixing ratio of polymers | [η] | LCEC | Tan δ of vulcanized specimen (60° C.) | Wet grip index |
|---|---|---|---|---|---|
| Examples | | | | | |
| 1 | A/D = 78/22 | 3.32 | 1.35 | 0.127 | 103 |
| 2 | B/D = 82/18 | 2.38 | 1.35 | 0.126 | 103 |
| 3 | C/D = 89/11 | 1.88 | 1.35 | 0.126 | 103 |
| 4 | E/H = 64/36 | 2.81 | 1.35 | 0.124 | 104 |
| 5 | F/H = 72/28 | 2.11 | 1.35 | 0.124 | 105 |
| 6 | E/G = 47/53 | 2.43 | 1.35 | 0.127 | 105 |
| 7 | F/G = 57/43 | 1.97 | 1.35 | 0.127 | 105 |
| 8 | A/D = 91/9 | 3.71 | 0.75 | 0.110 | 104 |
| 9 | B/D = 96/4 | 2.68 | 0.75 | 0.108 | 104 |
| 10 | A = 100 | 4.08 | 0.33 | 0.092 | 103 |
| 11 | B = 100 | 2.77 | 0.58 | 0.097 | 103 |
| 12 | C = 100 | 2.04 | 0.90 | 0.110 | 103 |
| 13 | E = 100 | 3.65 | 0.54 | 0.096 | 104 |
| 14 | F = 100 | 2.71 | 0.79 | 0.108 | 105 |
| 15 | E/D = 90/10 | 3.36 | 0.98 | 0.113 | 103 |
| Comparative Examples | | | | | |
| 1 | G/H = 76/24 | 1.21 | 2.25 | 0.152 | 105 |
| 2 | B/D = 72/28 | 2.32 | 1.80 | 0.140 | 103 |
| 3 | SBR #1500*[1] = 100 | 1.80 | — | 0.146 | 100 |
| 4 | G = 100 | 1.27 | 2.08 | 0.147 | 105 |
| 5 | H = 100 | 1.01 | 2.78 | 0.160 | 105 |

*[1]SBR #1500: Styrene-butadiene rubber prepared by emulsion polymerization method (Sumitomo Chemical Company, Limited)

EXAMPLES 16-19 AND COMPARATIVE EXAMPLES 6-8

Various copolymers active ends of which were bound (referred to as "modified polymer chain" hereinafter) were obtained by adding silicon tetrachloride to various polymerization active styrene-butadiene copolymer solution obtained by copolymerizing styrene and butadiene in cyclohexane in the presence of diglyme (diglycol methyl ether) using n-butyllithium as an initiator. A portion of said polymer solution was taken before the addition of silicon tetrachloride and $\overline{MW}$ was calculated from intrinsic viscosity [η] of unmodified copolymer in accordance with $\overline{MW}=60,660\times[\eta]^{1.282}$. Proportion ($\beta$) of the modified polymer chain was obtained by the method given below and LCEC of the copolymer was calculated by the following formula in view of the fact that molecular weight of modified polymer chain is $4\times\overline{MW}$.

$$LCEC = (1-\beta)\cdot\frac{2\times 10^5}{\overline{MW}} + \beta\cdot\frac{4\times 10^5}{4\times\overline{MW}}$$

MEASUREMENT OF PROPORTION OF MODIFIED POLYMER CHAIN IN THE POLYMER

HLC-802UR of Toyo Soda Mfg. Co., Ltd. was used and columns of $10^3$, $10^4$, $10^6$ and $10^7$ were chosen as partition columns and a refractometer was employed as a detector. Molecular weight distribution of the polymer was measured at 40° C. using tetrahydrofuran (THF) as a developing solvent. Relative ratio of heights of peaks corresponding to respective mean molecular weights of the modified polymer chain and the unmodified polymer chain was taken as weight proportion of the polymer chains.

In the same manner as in Examples 1–15, the copolymer was mixed with compounding ingredients and the mixture was vulcanized to obtain specimens for measurement of properties.

On these specimens, tan δ was measured in the same manner as mentioned hereinbefore to obtain the results as shown in Table 3.

TABLE 3

| | Proportion of modified polymer chain | [η] before modification | LCEC | tan δ (60° C.) |
|---|---|---|---|---|
| Examples | | | | |
| 16 | 72 | 1.26 | 1.35 | 0.124 |
| 17 | 36 | 1.54 | 1.33 | 0.122 |
| 18 | 89 | 1.30 | 1.12 | 0.113 |
| 19 | 84 | 1.41 | 1.06 | 0.108 |
| Comparative Examples | | | | |
| 6 | 54 | 1.05 | 1.94 | 0.140 |
| 7 | 38 | 1.12 | 1.98 | 0.143 |
| 8 | 65 | 1.08 | 1.73 | 0.138 |

EXAMPLES 20-21 AND COMPARATIVE EXAMPLES 9-10

As a rubber material was used a mixture of the elastomeric polymer (or mixture) haivng an LCEC of 1.5 or less used in Examples 1 to 15 and a natural rubber or SBR produced by emulsion polymerization method in a given ratio. This rubber material was mixed with the compounding ingredients, the mixture was vulcanized to obtain specimens and properties of these specimens were measured in the same manner as in Examples 1 to 15. The results are shown in Table 4.

TABLE 4

| | Rubber material | | tan δ (60° C.) | Wet grip index |
|---|---|---|---|---|
| Examples | | | | |
| 20 | Polymers E/G = 47/53 mixture | 80 parts | 0.121 | 102 |
| | Natural rubber | 20 parts | | |
| 21 | Polymers A/D = 91/9 mixture | 70 parts | 0.122 | 103 |
| | SBR #1500 | 30 parts | | |
| Comparative Examples | | | | |
| 9 | Polymer C | 30 parts | 0.110 | 95 |
| | Natural rubber | 70 parts | | |
| 10 | Polymer E/G = 47/53 mixture | 40 parts | 0.139 | 102 |
| | SBR #1500 | 60 parts | | |

We claim:

1. A diene elastomer composition which contains a rubber material consisting essentially of 60 to 100% by weight of an elastomeric polymer and 0 to 40% by weight of a rubbery component: in which the elastomeric polymer is selected from the group consisting of butadiene homopolymer and styrene-butadiene copolymer produced by having an organolithium compound as a polymerization initiator, and having a long chain end concentration (LCEC) of 1.5 or less as defined by the following formula:

$$LCEC = \Sigma_i \beta i \times (\alpha \times 10^5)/(\overline{MW})_i$$

wherein

α: a constant defined as the total number of long chain ends per polymer chain;

$\overline{MW}$: a value obtained from instrinic viscosity of the polymer when measured in toluene at 30° C. by the following formulas:

$$MW = 70.660 \times [\eta]^{1.282}$$

for styrene-butadiene copolymer, $$MW = 79.167 \times [\eta]^{1.443}$$

for butadiene homopolymer,

βi: weight fraction of component i when $\overline{MW} = (\overline{MW})_i$, and the rubbery component is a natural rubber, synthetic isoprene rubber, an emulsion polymerized styrene-butadiene rubber or a high cis-polybutadiene rubber."

2. A diene elastomer composition according to claim 1 wherein the elastomeric polymer has an LCEC of 0.2 to 1.4 and a glass transition temperature of −55° C. to −25° C.

3. A diene elastomer composition according to claim 1 which contains 30 to 80 parts by weight of carbon black and 0 to 30 parts by weight of oil per 100 parts by weight of the rubber material.

4. A diene elastomer composition according to claim 1 containing the rubbery component.

5. A diene elastomer composition according to claim 1 free of the rubbery component.

* * * * *